United States Patent
Feuser et al.

(10) Patent No.: US 7,647,506 B2
(45) Date of Patent: Jan. 12, 2010

(54) METHOD AND CONFIGURATION FOR THE TRANSMISSION OF SIGNALS FROM GENERATING FUNCTIONAL UNITS TO PROCESSING FUNCTIONAL UNITS OF ELECTRICAL CIRCUITS

(75) Inventors: Markus Feuser, Hamburg (DE); Detlef Mueller, Barsbuettel (DE)

(73) Assignee: NXP B.V., Eindhoven (NL)

( * ) Notice: Subject to any disclaimer, the term of this patent is extended or adjusted under 35 U.S.C. 154(b) by 708 days.

(21) Appl. No.: 10/319,891

(22) Filed: Dec. 13, 2002

(65) Prior Publication Data

US 2003/0163725 A1 Aug. 28, 2003

(30) Foreign Application Priority Data

Dec. 19, 2001 (DE) ............................. 101 62 310

(51) Int. Cl.
*G06F 12/14* (2006.01)
*G06F 1/26* (2006.01)
*G06F 7/04* (2006.01)

(52) U.S. Cl. .......................... 713/193; 726/34; 726/16

(58) Field of Classification Search ................. 713/193; 726/34, 16
See application file for complete search history.

(56) References Cited

U.S. PATENT DOCUMENTS

| | | | | |
|---|---|---|---|---|
| 3,735,353 A * | 5/1973 | Donovan et al. | ....... | 340/825.37 |
| 4,023,163 A * | 5/1977 | Krishnaiyer et al. | ........ | 340/534 |
| 5,418,353 A * | 5/1995 | Katayama et al. | ........... | 235/380 |
| 5,497,395 A * | 3/1996 | Jou | .............................. | 370/209 |
| 5,751,765 A * | 5/1998 | Matsubara | .................... | 375/219 |
| 5,793,318 A * | 8/1998 | Jewett | ......................... | 341/118 |
| 5,796,827 A * | 8/1998 | Coppersmith et al. | ........ | 713/182 |
| 5,864,588 A * | 1/1999 | Miyamoto | .................... | 375/326 |
| 5,874,725 A * | 2/1999 | Yamaguchi | .................. | 235/492 |
| 5,889,860 A * | 3/1999 | Eller et al. | ..................... | 705/51 |
| 6,028,492 A * | 2/2000 | Matsubara | .................... | 331/111 |
| 6,209,098 B1 * | 3/2001 | Davis | ........................... | 713/194 |
| 6,223,990 B1 * | 5/2001 | Kamei | .......................... | 235/492 |
| 6,356,738 B1 * | 3/2002 | Schneider et al. | ........... | 455/41.2 |
| 6,531,954 B1 * | 3/2003 | Kim | ............................. | 340/5.21 |
| 6,747,548 B1 * | 6/2004 | Yamaguchi | ............... | 340/10.51 |
| 6,802,008 B1 * | 10/2004 | Ikefuji et al. | ................... | 726/20 |
| 7,013,415 B1 * | 3/2006 | Kamei et al. | ................. | 714/729 |
| 7,233,948 B1 * | 6/2007 | Shamoon et al. | ................ | 707/9 |
| 7,242,766 B1 * | 7/2007 | Lyle | ............................... | 380/2 |
| 2003/0061540 A1 * | 3/2003 | Lee et al. | ........................ | 714/31 |

* cited by examiner

*Primary Examiner*—Techane J Gergiso

(57) ABSTRACT

In an integrated-circuit chip having intercommunicating modular functional units of electrical circuits, wired transmission of sensitive information signals between the functional units of the electrical circuits involves generating a reference signal and coding the sensitive information signals, after being emitted by a generating functional unit in the chip, with the reference signal to disguise the sensitive information represented by the sensitive information signals. The coded sensitive information signals are decoded with the reference signal before the sensitive information signals are received by a processing functional unit in the chip. At least one signal of the reference signal and the decoded sensitive information signals are monitored, and a hacker attack is identified in response to a determination that the decoded sensitive information signal is other than a plausible signal.

20 Claims, 2 Drawing Sheets

METHOD AND CONFIGURATION FOR THE TRANSMISSION OF SIGNALS FROM GENERATING FUNCTIONAL UNITS TO PROCESSING FUNCTIONAL UNITS OF ELECTRICAL CIRCUITS

BACKGROUND OF THE INVENTION

The invention relates to a method and a configuration for the transmission of signals from generating functional units to processing functional units of electrical circuits, which can be used, in particular, to prevent the interception of secret information being exchanged between two functional units of a circuit that are located separately in the layout. Since secret information, for instance cipher information or personal data, is stored on Smartcard controllers, this represents a special application area of the invention.

Developments in microelectronics in the 1970s enabled small computers to be produced in credit card format without a utilization interface. Computers of this kind are known as Smartcards. In a Smartcard, data memories and arithmetic-logic units are integrated in a single chip just a few square millimeters in size. Smartcards are used, in particular, as telephone cards, GSM-SIM cards, in the banking industry and the health sector. The Smartcard has thus become an omnipresent computer platform.

Smartcards are currently viewed primarily as secure storage locations for secret data, and as a safe execution platform for cryptographic algorithms. The assumption of a relatively high security of data and algorithms on the card is based on the hardware structure of the card and the interfaces leading to the outside. The card is presented to the outside world as a "black box" having a functionality that can be exploited only via a well-defined hardware and software interface, and which can compel certain safety policies. On the one hand, access to data can be linked to certain conditions. Critical data, such as secret codes of a public key method, may even be completely withdrawn from access from outside. On the other hand, a Smartcard is capable of executing algorithms without the execution of individual operations being observable from outside. The algorithms themselves can be protected on the card from being modified and read out. In the object-oriented sense, the Smartcard can be regarded as an abstract data type which has a well-defined interface, exhibits a specified behavior and is even capable of ensuring adherence to certain integrity conditions as regards its status.

Essentially, there are two different types of Smartcards. Memory cards have only one serial interface, one addressing and safety logic circuit and ROM and EEPROM memories. These cards have only limited functionality and serve a specific purpose. For this reason, they are especially cheap to produce. In principle, Smartcards produced as microprocessor cards represent a completely universal computer.

The production and delivery process for chip cards can be divided into the following phases:
producing the semiconductor
embedding the semiconductor
printing the card
personalizing the card
issuing the card.

In general, each phase is carried out by a company specializing in this particular work. In producing the semiconductor, good in-company security must be ensured, particularly in the case of cards with hard-wired safety logic. In order that the manufacturer can perform a correct final test, the complete memory must be freely accessible. Only after the final test is the chip secured with a transport code. Subsequently, access to the card memory is possible only by authorized agencies who know the transport code. The theft of brand-new semiconductors will therefore not entail any consequences. Authorized agencies may be personalizers or card issuers. No further security functions are necessary for the embedding and printing processes. The companies in question do not need to know the transport code.

In general, it is not the card manufacturer but the issuing agency (for instance a bank, telephone company, health insurance company etc.) that transfers the person-specific data to the card. This process is known as personalization. Knowledge of the transport code is necessary for this.

The issuing of the card, i.e. transport from the issuing agency to the card holder, represents a further security problem. Strictly speaking, only personal issuing to the card holder against his signature and presentation of proof of identity is secure. Although dispatch by post is often more economical, it is also fairly insecure. Another problem is the sending of the PIN to the card holder, where the same care must be taken as with the card.

Owing to the sensitive, security-relevant contents of the memories located on Smartcard controllers, additional protection, apart from observance of these security measures, must be ensured against possible activities of hackers, extending into all phases of the life of a Smartcard—starting from its production, through the transport and use of the card, up to the manipulation of cards that have become unusable.

Some hacker attacks use the approach of manipulating signals that are exchanged between two functional units located separately in the layout. Sensitive signals on Smartcard controllers are, for example, reset and status signals as well as timing circuits. These are usually exchanged between analog subblocks and the digital logic block over fairly great distances on the chip. Hitherto, sensitive circuits of this kind have been protected by means of special layouts, for example:
  the circuits are laid out on low-level metallic planes because they are thereby difficult to probe.
  the circuits are "hidden" beneath higher-level tracks.
  they are routed in parallel with other, less sensitive circuits, so the sensitive circuits are not conspicuous.

An experienced hacker can, however, still identify, connect and thereby manipulate the sensitive circuits with a little effort.

SUMMARY OF THE INVENTION

Embodiments of the invention specify a method and a configuration of the same generic type, by means of which the interception of secret information being exchanged between two functional units of a circuit that are located separately in the layout is effectively prevented in a simple manner.

One exemplary advantage of the invention may consists in the fact that, with the method for transmitting signals from generating functional units to processing functional units of electrical circuits, the signals to be transmitted are coded and/or modulated after being emitted by the generating functional unit, and decoded and/or demodulated before being received by the processing functional unit.

An exemplary embodiment of the invention provides for transmitting signals from generating functional units to processing functional units of electrical circuits is advantageously structured in such a way that at least one means for coding/decoding and/or modulation/demodulation of the signals to be transmitted from a generating functional unit to a processing functional unit of an electrical circuit is arranged between the generating functional unit and the processing functional unit.

The method in accordance with some embodiments of the invention can be applied with particular advantage if the transmission of the signals takes place between a generating functional unit and a processing functional unit of a Smartcard controller. In one embodiment of the method in accordance with the invention, the coding and/or modulation of the signals to be transmitted takes place through gating with a reference signal. In addition, it is advantageous if the reference signal comprises one or more bits.

In a further embodiment of the method in accordance with the invention, the generation of a time-dependent reference signal takes place through the use of clock signals and/or through the use of time-adjustable signals. It has also proved advantageous if the reference signals are generated by at least one signal generator. In addition, in another embodiment of the method in accordance with the invention, the reference signal is generated both in the generating functional unit and the processing functional unit.

In some embodiments, it may prove practical for a reference signal generated in the generating functional unit to be transmitted to the processing functional unit. It has further proved advantageous if monitoring of the reference signal and/or monitoring of the reproduced signal takes place.

One advantageous embodiment of the configuration consists in the generating functional unit and the processing functional unit being part of a Smartcard controller. In embodiments of the configuration in accordance with the invention, the means for coding/decoding and/or modulation/demodulation of the signals comprise at least one signal generator and two means for gating signals. An XOR-gate is advantageously used as the means for gating signals. The means for coding/decoding and/or modulation/demodulation of the signals can be controlled by a clock-signal transmitter.

In addition, it has proved advantageous with the configuration in accordance with the invention if the means for coding/decoding and/or modulation/demodulation of the signals is/are arranged in the layout of the circuit in the immediate vicinity of the generating functional unit and/or the processing functional unit. A further advantage is that, where multiple signal generators are used, these are each executed in a different layout, so that a hacker cannot recognize the similarity.

In a further embodiment of the configuration in accordance with the invention, the means for coding/decoding and/or modulation/demodulation of the signals is/are arranged in the layout of the circuit in alternating combination with further elements of the glue logic of the generating functional unit and/or processing functional unit. The configuration in accordance with the invention is advantageously designed in such a way that the generating functional unit(s) is/are in the form of an analog circuit, and the processing functional unit(s) is/are in the form of a digital logic circuit.

A further advantage of the configuration in accordance with the invention can be seen in the fact that the signal generator(s) is/are in the form of counter(s). In addition, in a preferred embodiment of the configuration in accordance with the invention, the generating functional unit(s) and/or the processing functional unit(s) are component parts of an integrated circuit.

Embodiments of the invention helps to prevent attacks that undertake to manipulate signals being exchanged between two functional units located separately in the layout by coding techniques. Even dynamic probing is possible only if the hacker knows the code.

The security of the chip as a whole is greatly increased by embodiments of the invention. Any manipulation of sensitive status information is rendered impossible, since the protection of sensitive information comes into effect right at the cryptological level. The extremely complex layout measures that have been customary hitherto for protection against hacker attacks can be dispensed with or greatly simplified, since the sensitive information (in plain text) is present only locally. On the generating side and the processing side, the relevant circuit components can be easily mixed or hidden with further glue logic.

BRIEF DESCRIPTION OF THE DRAWINGS

The invention will be further described with reference to examples of embodiments shown in the drawings, to which, however, the invention is not restricted.

DETAILED DESCRIPTION OF THE EXEMPLARY EMBODIMENTS OF THE INVENTION

The two embodiments of variant 1 (FIG. 1) and variant 2 (FIG. 3) exhibit a somewhat differing structure. In both variants, a reference signal is generated for coding and/or modulation. The significant difference between the two structures lies in the fact that the reproduction, demodulation or decoding of the sensitive signal from the modulated and/or coded signal, which may comprise one or more bits, takes place in variant 1 with a second reference signal, which is either generated a second time or—as in variant 2—originates directly from the first reference signal.

Figure 1:
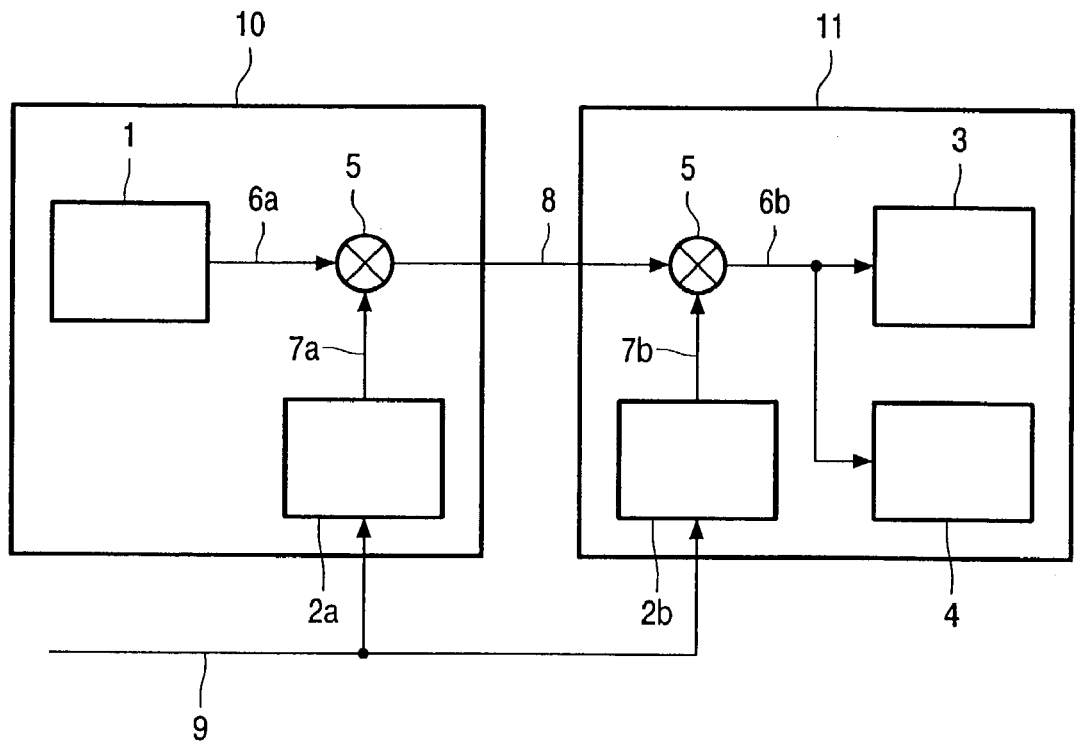
FIG. 1 shows a block circuit diagram of the circuit in accordance with the invention with the use of two signal generators (variant 1).
Figure 2:
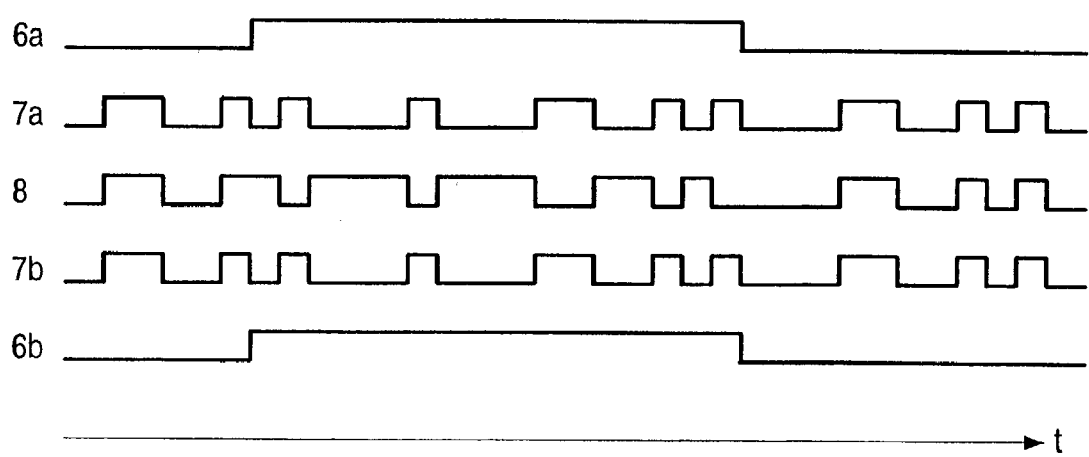
FIG. 2 shows a signal waveform of variant 1.

A clock signal 9 is used primarily in order to form the reference signal (see FIGS. 1 and 2). Apart from the clock signal 9, other time-adjustable signals may also be used to generate the reference signal.

Monitoring of the reproduced signal is also recommended. If certain criteria are not fulfilled, a hacker attack can be assumed. This can be reacted to automatically in a predefined manner. As an alternative or in parallel with the monitoring of the reproduced signal, monitoring of the reference signal (variant 2) may take place. If certain criteria are not fulfilled, here again a hacker attack can be assumed. This can also be reacted to automatically in a predefined manner.

Below, the invention will be described in detail using the example of the circuit in FIG. 1. The sensitive status signal 6a is formed by a generating functional unit 1, which may also be constructed in analog circuit engineering. Instead of passing this sensitive signal 6a on directly to a processing functional unit 3, it is firstly gated with a reference signal 7a, which can be time-adjusted in a specific manner, wherein reference signal 7a is generated by a signal generator 2a of the generating functional unit 1. This gating may hereby comprise a modulation of the generated sensitive signal 6a, for instance by an XOR gate 5. The generating (analog) functional unit 1, the signal generator 2a and the XOR gate 5 of the generating circuit are located close together in the layout, so the sensitive circuit is very short.

A signal 8 coded in this manner is passed via a connection to the next block (processing block 11) for processing. This connection may be long. Once it has arrived at processing block 11, an identical reference signal 7b is again formed with a signal generator 2b of the processing circuit, which is of identical structure to signal generator 2a of the generating circuit. It is not of identical design, i.e. the layout differs, so the hacker cannot recognize the similarity. With the aid of reference signal 7b, the sensitive signal is reproduced as signal 6b. A monitoring circuit 4 can check whether the regenerated sensitive signal 6b is "plausible", i.e. whether, for instance, it remains stable in comparison with the reference signal 7b, and thereby oscillates less frequently. If not, a hacking attempt may be assumed as the coded signal 8 has been manipulated. In this case, the circuit can, for example, be deactivated or reset. The erasure of the non-volatile memory located on the Smartcard controller, rendering the Smartcard controller unusable, would also be conceivable.

The coded status transmission constructed in this way in accordance with variant 1 (FIG. 1) functions with extremely varied reference signals. An example of coding of this kind is shown in FIG. 2.

The generated sensitive signal 6a is XOR-gated with the reference signal 7a generated by a signal generator 2a of the generating circuit. From the coded signal 8 formed in this way, the sensitive signal 6b can be reproduced by a second XOR-gating with the reference signal 7b generated by a signal generator 2b of the processing circuit.

Figure 3:
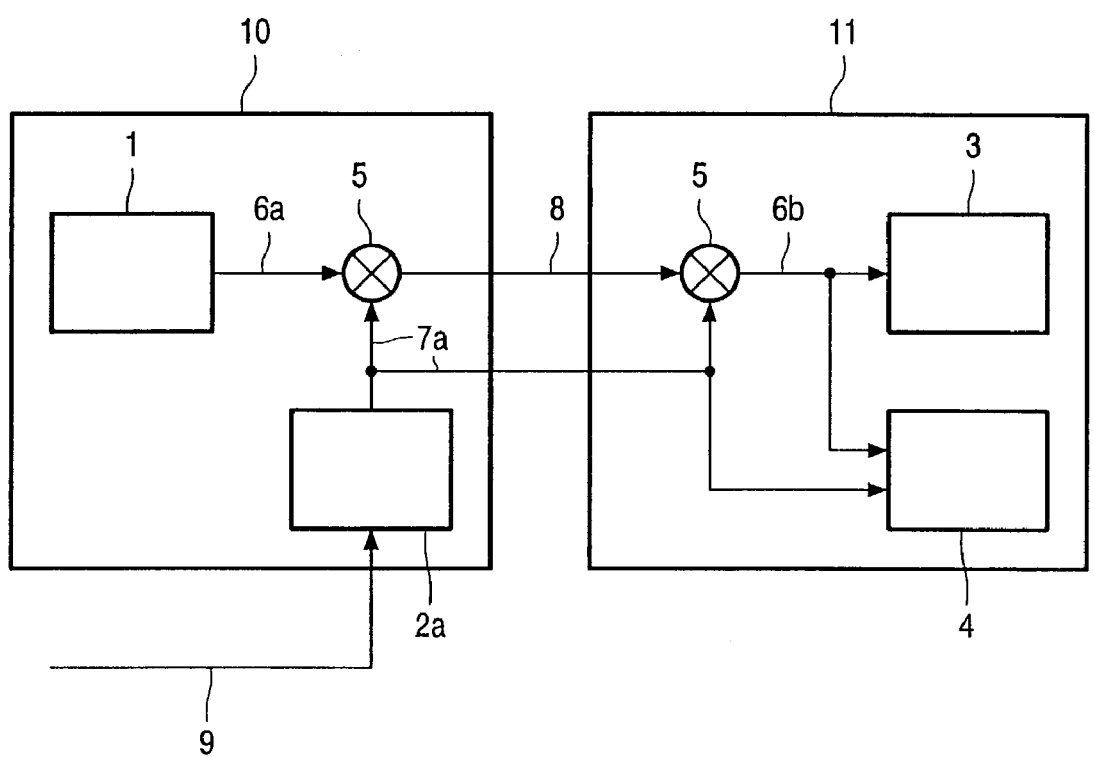
FIG. 3 shows a block circuit diagram of the circuit in accordance with the invention with the use of one signal generator (variant 2).

A different realization of the invention (variant 2) is shown in FIG. 3. The difference from variant 1 lies in the fact that the signal generator 2b of processing circuit 11—also designated processing block 11—can be dispensed with if the reference signal 7a, which is generated in the generating functional unit 1—also designated generating circuit 1—is also transmitted to processing block 11. In order to ensure complete security, however, reference signal 7a (generated in generating circuit 1) is also monitored, in addition to the restored sensitive signal 6b. Reference signal 7a (generated in generating circuit 1) must be checked as to whether it also exhibits a "plausible" signal waveform. As in variant 1, certain actions may be initiated if this "plausibility check" recognizes an error.

Protection of the sensitive signal can be very high as a result of suitable coding. All known codings, modulating techniques and theories from the area of cryptology, of sequential logic systems and signal transmission can be used to form suitable reference signals. The reference signal(s) may also comprise more than one bit, for example, four bits. The signal generator(s) (2a, b) then comprise(s) a counter in the simplest case.

In principle, further signals, which are available during both generation and processing, may additionally be used to generate a reference signal that is as difficult as possible to recognize.

Monitoring circuit 4 in accordance with variant 2 may also comprise a sequential logic system, which, in variant 2, does not just check whether the reproduced sensitive signal 6b fulfils certain criteria. It also checks whether the reference is exhibiting a certain coding. With correctly selected coding, this is always possible if reference signal 7a exhibits certain redundancies.

The invention is not restricted to the embodiments described here. Rather, it is possible, by combining and modifying the said means and features, to realize further variants without exceeding the bounds of the invention.

In summary, the invention thereby relates to a method and a configuration for the transmission of signals from generating functional units to processing functional units of electrical circuits which can be used to prevent the interception of information being exchanged between two functional units that are located separately in the layout. The sensitive signal is formed by a functional unit. Instead of passing this signal on directly to the processing functional unit, it is gated with a reference signal formed by a signal generator. These circuit components are located close together in the layout, so the sensitive circuit is short. The coded signal is passed to the next block. This connection may be long. Once it has arrived at the next block, an identical reference signal is formed. The signal generator used for this purpose is not of identical design with the first one, so a hacker cannot recognize the similarity. The sensitive signal is reproduced with the reference signal. A monitoring circuit can check whether the regenerated signal is "plausible". If not, a hacking attempt can be assumed.

LIST OF REFERENCE NUMERALS

1 Generating functional unit
2a Signal generator of the generating functional unit
2b Signal generator of the processing functional unit
3 Processing functional unit
4 Monitoring circuit
5 XOR-gate
6a Generated (sensitive) signal
6b Reproduced (sensitive) signal
7a Reference signal generated by the signal generator of the generating functional unit
7b Reference signal generated by the signal generator of the processing functional unit
8 Coded signal
9 Clock signal
10 Signal-generating block
11 Processing block

The invention claimed is:

1. In an integrated-circuit chip having intercommunicating modular functional units of electrical circuits, a method for wired transmission of sensitive information signals between the functional units of electrical circuits, the method comprising:
    generating a reference signal;
    coding the sensitive information signals, after being emitted by a generating functional unit in the chip, with the reference signal to disguise the sensitive information represented by the sensitive information signals;
    decoding the coded sensitive information signals, received via an electrical connection, with the reference signal before the sensitive information signals are received by a processing functional unit in the chip;
    monitoring at least one signal of the reference signal and the decoded sensitive information signals; and
    identifying a hacker attack in response to a determination that the decoded sensitive information signal is other than a plausible signal.

2. A method as claimed in claim 1, wherein the transmission of the signals takes place between a generating functional unit and a processing functional unit of a Smartcard controller, the method further comprising:
    modulating the sensitive information signals, after being emitted by the generating functional unit in the chip, with the reference signal to disguise the sensitive information represented by the sensitive information signals, and
    demodulating the modulated sensitive information signals, received via the electrical connection, with the reference signal before the sensitive information signals are received by the processing functional unit in the chip.

3. A method as claimed in claim 1, wherein the coding of the signals to be transmitted takes place through gating with the reference signal.

4. A method as claimed in claim 3, wherein the reference signal comprises one or more bits.

5. A method as claimed in claim 3, further comprising generating the reference signal as a time-dependent reference signal, the generation of said reference signal takes place through the use of at least one of clock signals and time-adjustable signals.

6. A method as claimed in claim 3, wherein the reference signal is generated by at least one signal generator.

7. A method as claimed in claim 3, further comprising generating the reference signal at both the generating functional unit and the processing functional unit.

8. A method as claimed in claim 3, further comprising generating a reference signal in the generating functional unit and providing the generated reference signal to the processing functional unit.

9. An integrated circuit chip comprising:
intercommunicating modular functional units for transmission of first sensitive information signals between the modular functional units;
circuitry for generating a reference signal;
circuitry for coding the first signals, provided by a generating functional unit in the chip, with the reference signal to disguise the sensitive information represented by the first signals, into coded signals, and
circuitry for decoding the coded signals with the reference signal and providing the first signals to a processing functional unit in the chip, said circuitry for decoding being electrically connected to the circuitry for coding, and said circuitry for decoding being more distant from the generating functional unit than the circuitry for coding; and
circuitry for monitoring at least one signal of the reference signal and the decoded sensitive information signals, wherein the circuitry for monitoring is further configured to identify a hacker attack in response to unfulfilled monitoring criteria.

10. An integrated circuit chip as claimed in claim 9, wherein the generating functional unit and the processing functional unit are part of a Smartcard controller integrated circuit, the integrated circuit chip further comprising:
circuitry for modulating the first signals, provided by the generating functional unit, with the reference signal to disguise the sensitive information represented by the first signals, into modulated signals, and
circuitry for demodulating the modulated signals with the reference signal and providing the first signals to the processing functional unit, said circuitry for demodulating being electrically connected to the circuitry for modulating, and said circuitry for demodulating being more distant from the generating functional unit than the circuitry for modulating.

11. An integrated circuit chip as claimed in claim 9, wherein the circuitry for coding and the circuitry for decoding comprise at least one signal generator and two means for gating signals.

12. An integrated circuit chip as claimed in claim 11, wherein the means for gating signals is an XOR-gate.

13. An integrated circuit chip as claimed in claim 9, wherein the circuitry for coding and the circuitry for decoding can be controlled by a clock-signal.

14. An integrated circuit chip as claimed in claim 9, wherein the circuitry for coding is arranged in the chip to be closer to the generating functional unit than to the processing functional unit and wherein the circuitry for decoding is arranged in the chip to be closer to the processing functional unit than to the generating functional unit.

15. An integrated circuit chip as claimed in claim 9, wherein the circuit for coding and the circuit for decoding each comprise a reference signal generating circuit adapted to produce substantially the same reference signal, each reference signal generating circuit comprising a different layout in the integrated circuit.

16. An integrated circuit chip as claimed in claim 9, wherein the circuit for coding and the circuit for decoding are each arranged in the integrated circuit layout in alternating combination with further elements of glue logic of at least one of the generating functional unit and the processing functional unit.

17. An integrated circuit chip as claimed in claim 9, wherein the generating functional unit is in the form of an analog circuit, and the processing functional unit is in the form of a digital logic circuit.

18. An integrated circuit chip as claimed in claim 9, further comprising a reference signal generator for at least one of the circuit for coding and the circuit for decoding, the reference signal generator being in the form of a counter circuit.

19. An integrated circuit chip as claimed in claim 9, wherein the circuitry for monitoring is further configured to identify a hacker attack in response to a determination that the decoded sensitive information signal is instable in comparison with the reference signal and oscillates less frequently than the reference signal.

20. An integrated circuit chip as claimed in claim 9, wherein the circuitry for monitoring is further configured to identify a hacker attack in response to a determination that the reference signal used by the circuitry for decoding exhibits a signal waveform other than a plausible signal waveform.

* * * * *